United States Patent [19]

Hooser

[11] Patent Number: 5,034,407

[45] Date of Patent: Jul. 23, 1991

[54] PORTABLE STUMP REMOVER

[76] Inventor: Steven M. Hooser, 1 S. 726 Ott Ave., Glen Ellyn, Ill. 60137

[21] Appl. No.: 688,991

[22] Filed: Apr. 23, 1991

Related U.S. Application Data

[63] Continuation of Ser. No. 573,107, Aug. 28, 1990, abandoned, which is a continuation of Ser. No. 466,462, Jan. 16, 1990, abandoned.

[51] Int. Cl.$^5$ ............................................... B02C 1/04
[52] U.S. Cl. .................... 144/2 N; 37/2 R; 144/208 C; 144/231; 144/241
[58] Field of Search ............ 37/2 R; 241/101.7, 168, 241/169.1, 278 R, 294, 296; 144/2 N, 208 R, 208 C, 218, 231, 241

[56] References Cited

U.S. PATENT DOCUMENTS

| | | | |
|---|---|---|---|
| 3,911,979 | 10/1975 | Rousseau | 144/2 N |
| 4,530,385 | 7/1985 | York | 144/2 N |
| 4,621,668 | 11/1986 | York | 144/3 K |
| 4,681,145 | 7/1987 | York | 144/2 N |

FOREIGN PATENT DOCUMENTS 803907 2/1981 U.S.S.R. .

Primary Examiner—W. Donald Bray

[57] ABSTRACT

A portable tree stump remover, sufficiently light weight to be hand held by an operator, has an engine-driven cutting device with grinding teeth that rotate through a circular path. The cutting device is mounted to a base element that regulates the penetration depth of the grinding teeth into the tree stump and engages the tree stump when a predetermined penetration depth has been achieved.

45 Claims, 6 Drawing Sheets

PORTABLE STUMP REMOVER

This application is a continuation of application No. 07/573,107, filed Aug. 28, 1990, abandoned, which in turn, is a continuation of application Ser. No. 07/466,462, filed Jan. 16, 1990, abandoned.

BACKGROUND OF THE INVENTION

This invention relates generally to apparatus for removing tree stumps and roots and, more particularly, to a portable, self-contained stump remover that cuts and grinds a tree stump and may be hand held by the operator.

Prior portable tree stumpremovers, of the type that cut, grind and mill away a stump, are of complicated construction and are usually relatively large, cumbersome, heavy and expensive. Wheels are customarily employed to transport the stump remover to a tree stump and to support the stump remover during the cutting process. Many of these removers must be towed to and from the job site and many have no independent built-in driving power source and must be driven or powered by auxiliary equipment, such as by the power take off shaft of a tractor.

In contrast, the stump remover of the present invention exhibits none of these disadvantages and instead provides a unique stump remover of relatively simple and inexpensive construction, and which is small, light weight and entirely self-contained, thereby requiring no external power source whatsoever. Moreover, the stump remover can be handled by a single person (the operator) and, in fact, may be hand held by that person during cutting of a tree stump. Because of its physical size and weight, the stump remover of the invention may be transported to and from the job site in the trunk of an ordinary passenger automobile with the trunk lid closed, and this is possible even if the automobile is a sub-compact.

SUMMARY OF THE INVENTION

The invention provides a portable, self-contained stump remover which is manually movable by an operator across a tree stump to effect grinding thereof. The stump remover comprises a base element having a lower base surface for engaging and resting on the top of the tree stump when the stump remover is placed on the stump. The base element may take any of a variety of different forms, such as a plate, strip, bar, rod or merely an edge portion, in order to provide a suitable lower base surface for contacting and resting on the stump. There is at least one rotatable cutting device having a plurality of cutting teeth. Driving means (such as a small gasoline engine whose output shaft is mechanically coupled, either directly or indirectly, to the cutting device) rotates the cutting teeth through a circular path at least a portion of which path extends below the lower base surface provided by the element. A cutting depth is defined by the extent to which the rotating cutting teeth project below the base surface. When the operator places the stump remover on the tree stump so that the lower base surface engages the stump, the base surface effectively supports, guides and stabilizes the stump remover as it is manually moved by the operator across the stump, the stump thereby being cut away and ground down to the cutting depth as the stump remover traverses the stump. If the base element is located on one side of the rotating cutting teeth, the stump remover could be manually moved across the stump by the operator in the direction which permits the lower base surface to precede the rotating cutting teeth and ride on the top of the stump.

The amount by which the cutting teeth project below the lower base surface may be made adjustable to vary the cutting depth, depending upon the type of tree stump (hard or soft wood and the stump size) being removed. Appropriate handles may also be provided for hand holding and guiding the stump remover across the tree stump. Moreover, for safety reasons the cutting device may be shrouded to protect the operator not only from contact with the rotating cutting teeth but also from the flying wood debris, such as wood chips and sawdust, produced during the stump cutting process.

DESCRIPTION OF THE DRAWINGS

The features of the invention which are believed to be novel are set forth with particularity in the appended claims. The invention may best be understood, however, by reference to the following description in conjunction with the accompanying drawings in which like reference numbers identify like elements, and in which:

FIGS. 8 and 8a show another modification of the stump remover of FIGS. 1–6 in which the cutting depth is variable and wherein the position of a shroud is adjustable to vary the extent to which the rotating cutting teeth are enclosed by the shroud, FIG. 8 illustrating the shroud completely covering and surrounding the cutting teeth and the teeth being above the lower base surface to provide a zero cutting depth, while FIG. 8a shows a maximum cutting depth with the shroud being positioned to maximize the exposure of the cutting teeth out of the shroud;

DESCRIPTION OF THE PREFERRED EMBODIMENTS

Figure 1:
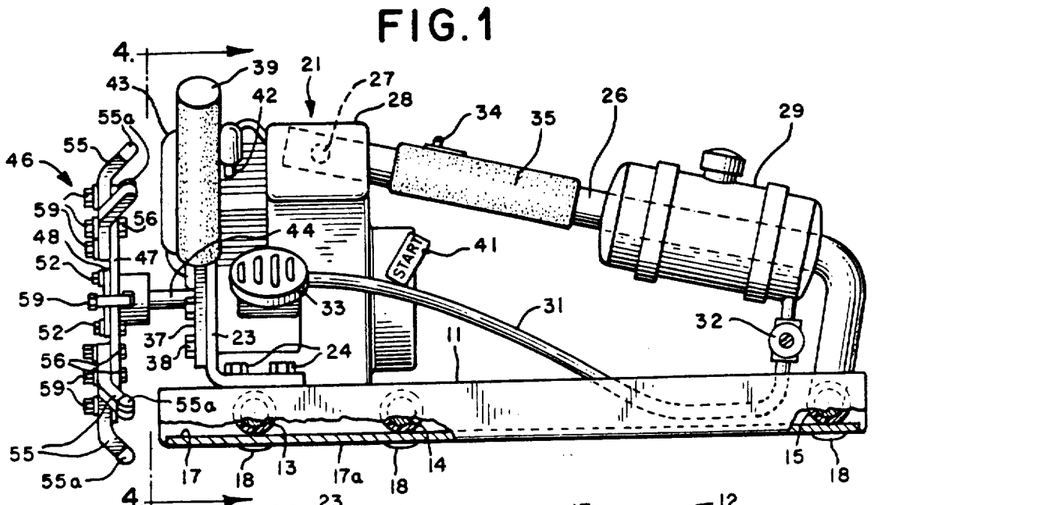
FIG. 1 is a side view of a tree stump remover constructed in accordance with one embodiment of the invention.
Figures 2, 3:
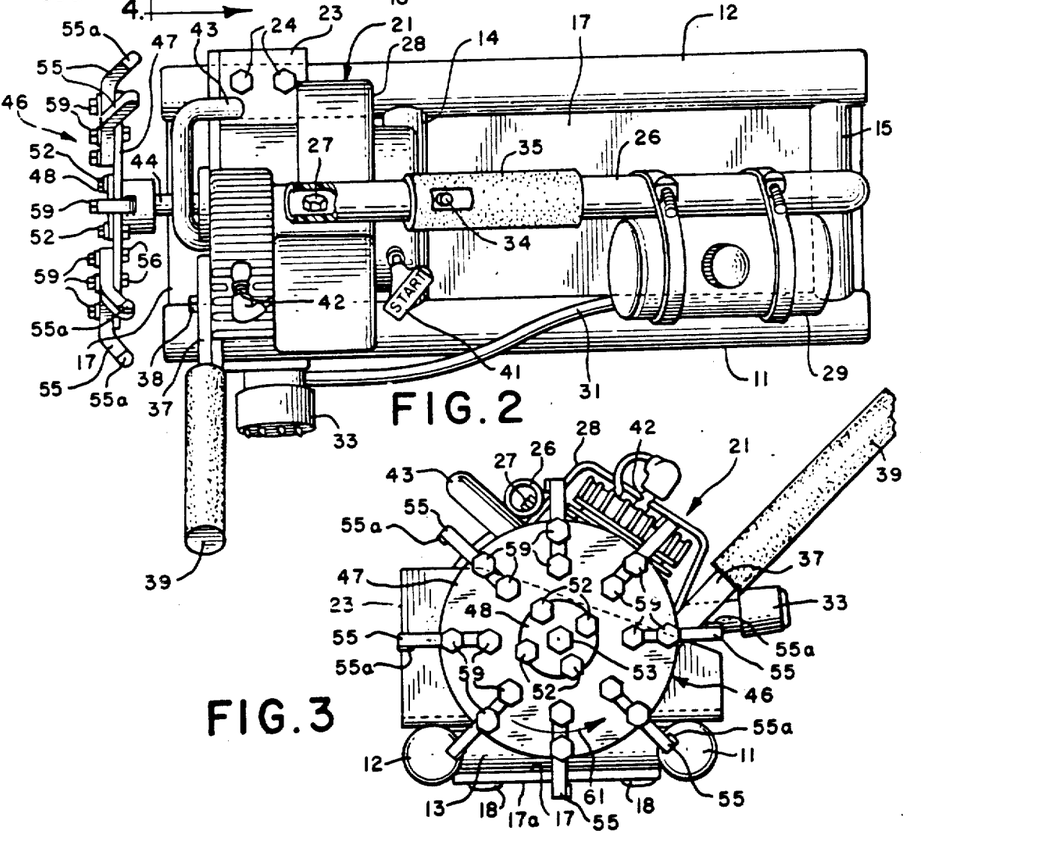
FIGS. 2 and 3 are top and end views respectively of the stump remover of FIG. 1.
Figures 4, 5:
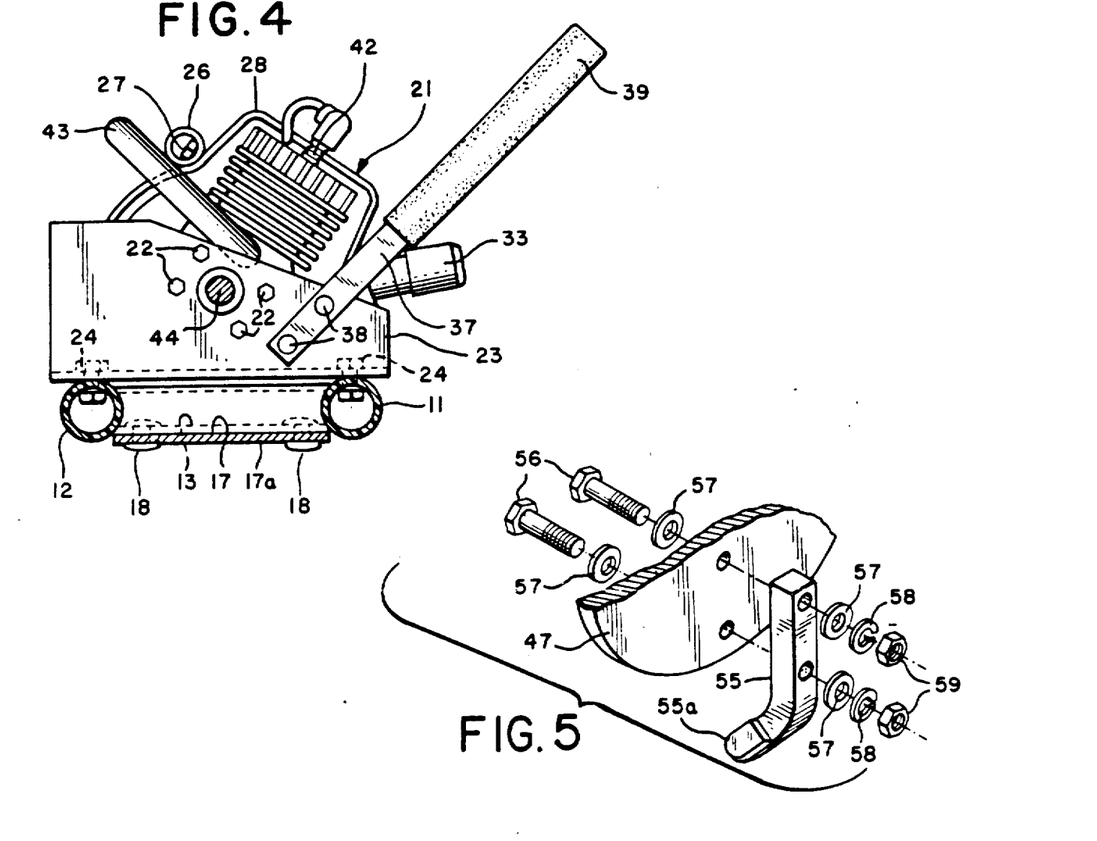
FIG. 4 is a sectional view of the stump remover taken along line 4—4 in FIG. 1.
FIG. 5 is a fragmentary, exploded, perspective view of a portion of the stump remover of FIG. 1 and shows the manner in which a cutting tooth may be removably affixed to a cutting device to facilitate replacement of the tooth.

Turning now to the embodiment of FIGS. 1-6, a rectangular-shaped plastic support frame is provided by the two long parallel plastic tubes 11 and 12 and the three shorter plastic tubes 13, 14 and 15 that attach to and interconnect the tubes 11 and 12. Secured to the bottom of the plastic frame is a rectangular-shaped plastic base plate or element 17 which is preferably affixed to the three tubes 13, 14 and 15 by means of a series of six carriage bolts 18 and appropriate nuts, the nuts being inside of the tubes, as best seen in FIG. 4. Only four of the six carriage bolts 18 are visible in FIGS. 1-6. The bottom surface 17a of base plate 17 provides a lower base surface.

A small gasoline internal-combustion engine or motor 21 is secured by bolts 22 (see FIG. 4) and appropriate nuts (not shown) to an L-shaped metal bracket 23 which in turn is affixed by bolts 24 and appropriate nuts (see FIG. 4) to tubes 11 and 12. An L-shaped plastic tube 26 has one end bolted (by bolt 27) to the housing 28 of gasoline engine 21 and the other end rigidly secured to tube 15. A gasoline tank 29, strapped to and held by tube 26, is coupled by fuel line 31 through an on/off fuel line valve 32 to the carburetor 33 of engine 21.

A dead man's switch 34 is mounted on tube 26 for manually controlling the operation of engine 21. Tube 26 also serves as a handle to be held by the operator's right hand. The portion of tube 26 to be grasped by the operator's right hand is covered by a cushion sleeve 35 for ease of handling. A handle for the operator's left hand is provided by a metal bar 37, one end of which is affixed by the two bolts 38 to bracket 23 while its other end is secured to the inside of a plastic tube over which is provided a cushion sleeve 39. The engine or motor 21 includes a pull start 41, a single spark plug 42 and an exhaust pipe 43 and operates in conventional fashion in order to rotate its output shaft 44 anytime switch 34 is held closed by the operator.

A rotatable cutting device 46 is mounted on and secured to output shaft 44 so as to be driven directly by engine 21. More specifically, device 46 includes a circular disc or wheel 47 which is affixed to hub 48 by means of bolts 49 (see FIG. 6) and nuts 52, the hub being secured to shaft 44 by bolt 53. Cutting device 46 has a series of eight cutting teeth 55 evenly spaced around its circular periphery and projecting beyond or outside of the circumference of disc 47. Preferably, these teeth are removably secured to the cutting device to facilitate easy replacement when the teeth are worn out. This is best illustrated in FIG. 5 where it is seen that each tooth 55 is attached to the periphery of wheel 47 by means of two bolts 56, four washers 57, two lock washers 58 and two nuts 59. When driven by engine 21, cutting device 46 rotates in a counter-clockwise direction as viewed in FIG. 3 and as indicated by the arrow 61 in the figure. The leading surfaces of the radially outermost ends or tips of the rotating teeth 55 are provided with a carbide coating 55a since, as will be seen, those are the surfaces that will engage and cut a tree stump.

Figure 6:
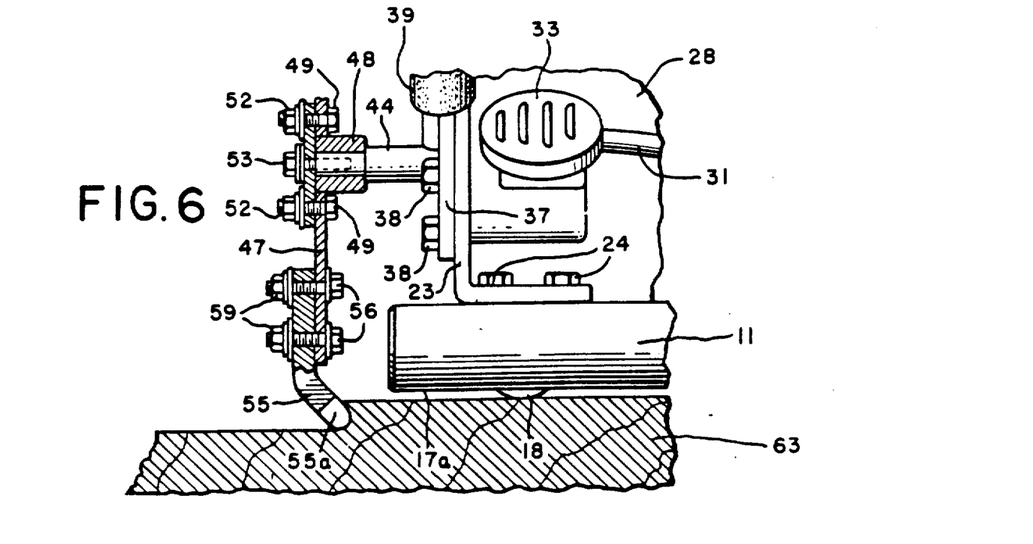
FIG. 6 is a fragmentary, side view, partly in section, of a portion of the stump remover of FIG. 1 and illustrates the manner in which the rotating cutting teeth cut into and remove a tree stump.

As is apparent, the circular path, through which the cutting teeth 55 rotate, defines a plane which is perpendicular to the planar, lower base surface 17a provided by the base plate 17. A portion of this path extends below the lower base surface 17a, the cutting depth of the stump remover being determined by the extent to which the rotating cutting teeth 55 project below the base surface 17a. In operation, after pull start 41 and switch 34 are actuated to start engine 21 and effect rotation of cutting device 46, the operator grasps cushion sleeve 35 with his right hand and cushion sleeve 39 with his left hand and lifts the stump remover and places the lower base surface 17a on top of a tree stump to be removed so that the cutting device is positioned next to, but does not contact, the tree stump. The operator then manually moves, specifically pulls or drags, the stump remover across the stump, preferably in a generally linear direction along the longitudinal axis of base plate 17 (namely to the right as viewed in FIGS. 1, 2 and 6), so that the base surface 17a precedes the rotating cutting teeth 55 and rides on top of the stump, the cutting teeth thereby cutting the stump away and grinding or milling it down to the cutting depth. This is clearly evident in FIG. 6 which illustrates a tree stump 63 being cut by the cutting teeth. Of course, the operator must traverse the stump repeatedly to completely remove the stump down to or below the ground level. Depending on the size of the tree stump and the type of tree, several passes across the stump will probably be necessary since each pass removes only a portion of the stump down to the cutting depth as shown in FIG. 6. The stump remover is capable of cutting and grinding a stump to a level substantially below the ground or grade level and well into the stump's roots.

It is to be appreciated that when base plate 17 is placed on and engages a tree stump, the base surface 17a functions to support, guide and stabilize the stump remover as it is manually moved by the operator across the stump. With the base plate providing a planar or flat lower base surface of substantial size to interface with the top surface of the stump, the stability of the stump remover is significantly enhanced. It is to be noted, however, that by sacrificing some stability the function performed by base plate 17 and base surface 17a may be performed by any of a wide variety of different structures having different sizes and shapes. For example, base plate 17 may comprise merely a narrow bar or strip or even a rod. All that is necessary is to provide some reference or base surface that will ride on top of the stump, and below which base surface the rotating cutting teeth project, as the stump remover is moved across the stump. The position of the base surface relative to the lowermost portion of the circular cutting path of the rotating cutting teeth, namely the distance or separation between that base surface and the lowermost portion of the cutting path, defines the cutting depth of the stump remover. Since many different devices or elements may be employed to provide such a base surface, some of the appended claims merely recite "a base element having a lower base surface".

While the output shaft 44 of the driving means, namely gasoline engine 21, is directly connected to the cutting device 46, it will be understood that the coupling between the driving means and the cutting device may be indirect and may comprise any appropriate drive, such as belt, gear, fluid, etc. If desired, the coupling may be adjustable or the driving means may be adjustable to vary the speed of the cutting device. In addition, it may be desirable to include a slipping means of some type or an automatically releaseable clutch in the coupling so that the driving connection from the driving means will be effectively interrupted if the cutting device becomes hung up or stuck, thereby minimizing the possibility of burning out the driving means.

Figure 7:
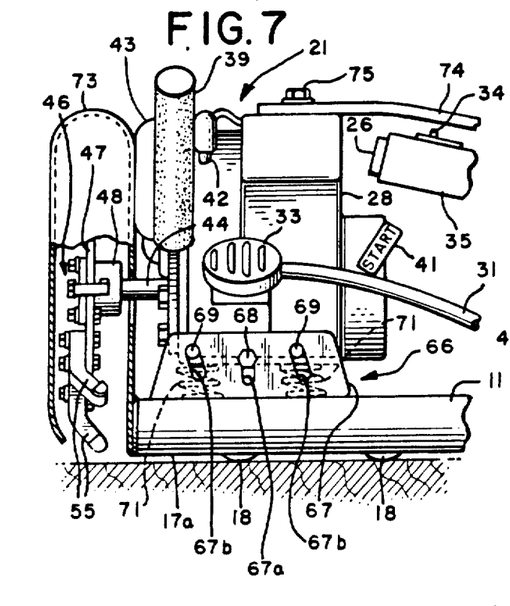
FIGS. 7 and 7a illustrate the manner in which the stump remover of FIGS. 1–6 may be modified in accordance with another embodiment of the invention to provide means for permitting adjustment of the cutting depth, and also to provide a shroud around the cutting device, the cutting device normally being retracted upwards by a spring bias into the shroud (shown in FIG. 7) so that the cutting teeth do not project below the lower base surface, but are capable of being lowered by the operator, against the force of the spring bias, in order to extend the teeth below the base surface (shown in FIG. 7a) to effect grinding of a tree stump.
Figure 7A:
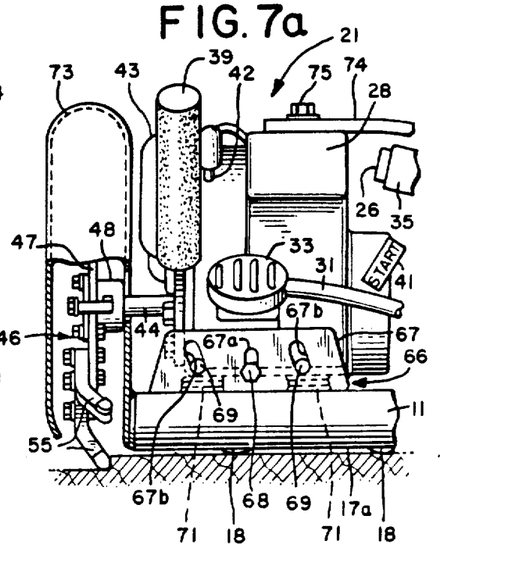

In the embodiment shown in FIGS. 1–6, the positions of the driving means (engine 21), the circular cutting path through which the cutting teeth 55 rotate, and the base element 17 and its lower base surface 17a are all effectively fixed relative to each other, the cutting depth of the stump remover thereby also being fixed. In the embodiment of FIGS. 7 and 7a, which is a modification of the FIGS. 1–6 embodiment, the position of the driving means and the circular cutting path are fixed relative to each other, but their positions are variable relative to that of the lower base surface to facilitate adjustment of the cutting depth. An adjustable cutting depth is desirable for cutting different types of tree stumps. In effect, the driving means is adjustably attached to the base element to permit adjustment of the cutting depth. This is achieved in the embodiment of FIGS. 7 and 7a by means of a bracket arrangement 66 that may be adjusted to vary the distance between the driving means 21, and thus the cutting teeth 55, and the lower base surface 17a of base element or plate 17.

To elucidate, a bracket plate 67, affixed to plastic tubes 11–15 and base plate 17, has a vertical slot 67a for accommodating a bolt 68 which is screwed into the housing 28 of engine 21. Plate 67 also has a pair of angular slots 67b through which a pair of studs 69 extend, the studs being rigidly secured to housing 28. A pair of coil springs 71 are mounted between engine 21 and the base structure formed by tubes 11–15 and base element 17. A shroud 73, affixed to tubes 11 and 12, surrounds cutting device 46 to provide a guard over the cutting device and a protective shield against flying wood debris, created during the stump cutting process, that may otherwise injure the operator of the stump remover. Shroud 73 has a downwardly extending open end through which the cutting teeth 55 may project in order to engage and grind a tree stump. When bolt 68 is loose and not tightly screwed into engine housing 28, engine 21 is positioned as shown in FIG. 7 and is spring mounted on tubes 11–15 and base element 17, the coil springs 71, which serve as a biasing means, normally biasing or urging engine 21 and cutting device 46 upwards in a direction away from base element 17. In that FIG. 7 position of engine 21, cutting device 46 is retracted upwards into shroud 73 to the extent that the lowermost projections of the cutting teeth 55 are positioned above the lower base surface 17a, thereby providing a zero cutting depth.

If it is desired to adjust the cutting depth to a particular selected level and to maintain the depth fixed at that level, engine 21 may be pushed down by the operator against the biasing force of springs 71 until the cutting teeth extend below base surface 17a the desired amount. When that selected cutting depth is reached, bolt 68 is tightened securely so that bracket plate 67 will be fixed to housing 28 and the selected cutting depth will be locked in FIG. 7a shows the stump remover when it is locked in at the maximum cutting depth. A bar 74, which is secured to engine housing 28 by bolt 75, provides a lever which may be depressed by the operator to facilitate pushing down of engine 21. As the engine is pushed down from its uppermost position shown in FIG. 7 to its lowermost position shown in FIG. 7a, bracket plate 67 and everything affixed thereto (namely, tubes 11–15, base element 17, base surface 17a and shroud 73) will remain stationary while engine 21 and cutting device 46 move both vertically and slightly sideways to the right due to the guiding effect of angular slots 67b and studs 69, the studs being camed and shifted to the right as they are pushed down to the bottom of slots 67b. The desirability of the lateral shifting of engine 21 and cutting device 46 will be appreciated later. Of course, since bolt 68 is also moving sideways to the right, as well as vertically down the slot 67a, as engine 21 is lowered, the diameter of the shaft of bolt 68 should be sufficiently smaller than the width of vertical slot 67a so that the slot will not interfere with the lateral movement of engine 21 and cutting device 46.

If it is not necessary to lock the stump remover at a particular desired cutting depth, bolt 68 may be loosened so that the spring action provided by coil springs 71 will automatically raise engine 21 and retract the cutting device 46 further into shroud 73, as shown in FIG. 7. In this way, until actual cutting of a stump is desired, no pressure is exerted by the operator on lever 74, thereby causing springs 71 to hold the stump remover in its FIG. 7 position so that the cutting teeth 55 will not project below base surface 17a. In this position, the protection afforded by shroud 73 is maximized. When stump cutting is desired, the operator merely depresses lever 74 to overcome the biasing force of springs 71 and lower the cutting teeth 55 to the extent desired. Of course, if the pressure on lever 74 is sufficient to push engine 21 down to its position shown in FIG. 7a, the maximum cutting depth is achieved. When it is desired to cease cutting, the operator releases the downward pressure on lever 74, and consequently on engine 21, whereupon springs 71 cause the cutting device 46 to retract further into shroud 73 as shown in FIG. 7. The advantage of angular slots 67b and studs 69 will now be appreciated. As engine 21 and cutting device 46 are raised, relative to base surface 17a, in going from their positions illustrated in FIG. 7a to their positions illustrated in FIG. 7, the cutting device moves laterally to the left. In other words, under the guidance of angular slots 67b and studs 69, cutting device 46 moves in an angular direction both upwards and sideways to the left. This maximizes the separation of the cutting device from base surface 17a, which will be helpful in freeing the cutting device if it ever gets hung up or stuck in a stump being cut.

Figure 8:
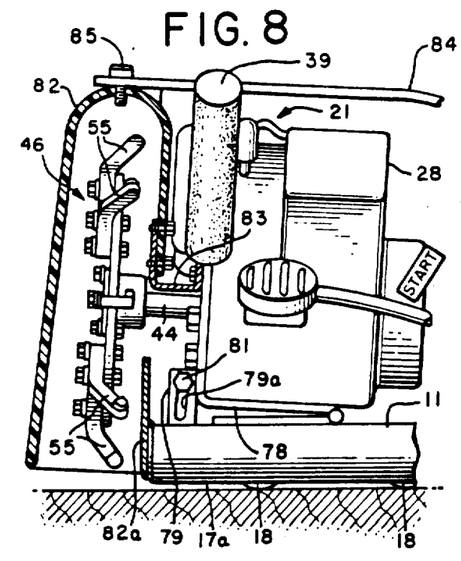
Figure 8A:
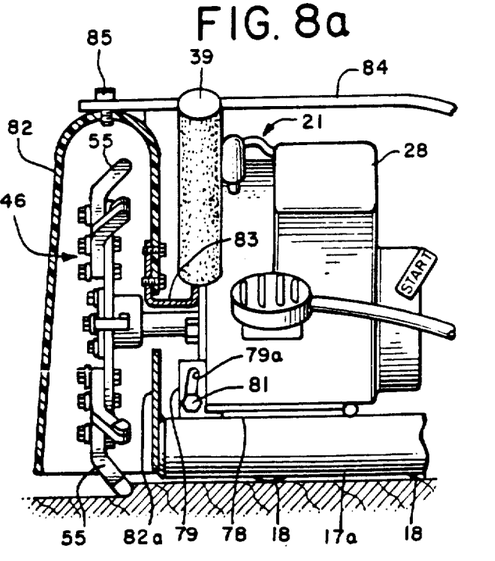

The embodiment of FIGS. 8 and 8a illustrates another arrangement for providing an adjustable engine mount to obtain a variable cutting depth that may be locked in at a desired setting. Engine 21 is pivotally connected, by means of hinge 78, to the base structure comprising tubes 11-15, base element 17 and base surface 17a. The position of engine 21, and consequently that of cutting device 46, relative to the position of base surface 17a may therefore be adjusted to establish the cutting depth at any desired setting over a predetermined range, and that setting may be locked in by means of bracket plate 79 which is affixed to tube 11 and has a slot 79a through which bolt 81 extends and screws into engine housing 28. In FIG. 8, hinge 78 is locked in its position providing a minimum, actually zero, cutting depth, while in FIG. 8a the hinge is adjusted to and locked in its maximum cutting depth position.

This embodiment also includes a shroud 82 covering and surrounding the cutting device 46 and whose position, relative to that of the cutting device, is adjustable by the operator to vary the extent to which the cutting teeth 55 project down through the shroud's open end. Portion 82a of the shroud is affixed to tubes 11 and 12, whereas the remaining and major portion of shroud 82 is attached to the engine housing 28 by means of a flexible spring bracket 83 that may be flexed by the operator to raise the shroud and increase the amount by which the cutting teeth 55 extend down through the shroud's open end. In effect, spring bracket 83 serves as a biasing means for normally biasing or urging shroud 82 in its position providing maximum coverage and enclosure of cutting device 46. Lever or bar 84, attached to shroud 82 by bolt 85, may be depressed by the operator to bend the flexible spring bracket 83 to raise the shroud, release of the pressure by the operator causing the shroud to lower, thereby increasing the enclosure around the cutting teeth 55.

Figure 9:
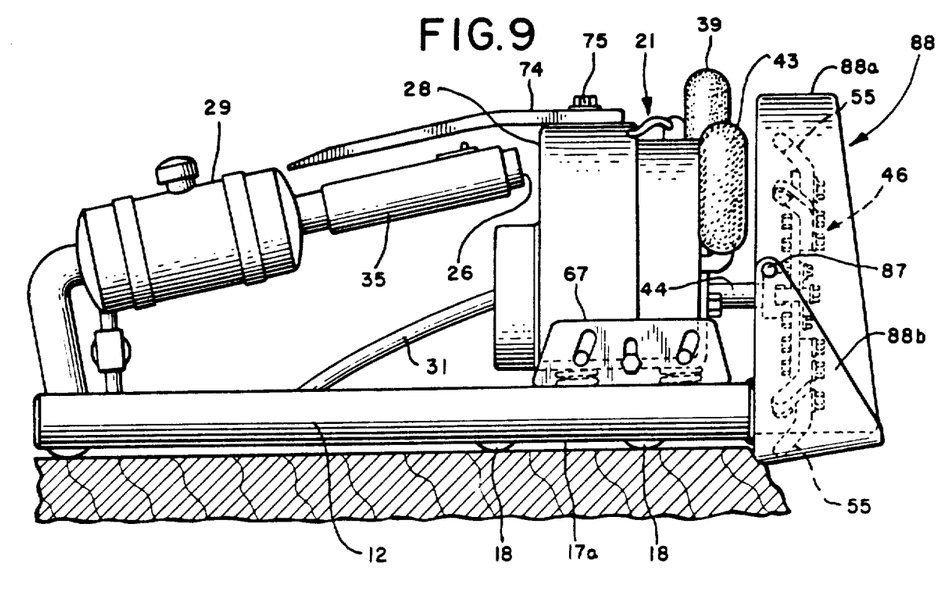
FIG. 9 is a side view of a tree stump remover constructed in accordance with another embodiment of the invention and illustrates that the shroud around the cutting teeth may have a pivotally connected guard that normally covers the cutting teeth which extend below the lower base surface and is pivoted and camed by the tree stump out from under the cutting teeth as the operator moves the stump remover across the stump.

The embodiment of FIG. 9 is similar to that of FIGS. 7 and 7a and includes a shroud 88, a major portion 88a of which is affixed to tubes 11 and 12 and encloses substantially all of the cutting device 46, portion 88a having a downwardly extending open end through which the cutting teeth 55 may project downward to engage and grind a tree stump. Shroud 88 has another, smaller portion 88b which is pivotally connected, by a pair of pivot pins 87 (only one of which is shown in FIG. 9), to and normally encloses and guards the open end of shroud portion 88a to completely envelop cutting device 46. Portion 88b is shown in its normal position in FIG. 9 and in that position extends below both the cutting teeth 55 and lower base surface 17a. When the operator pulls the stump remover across a stump, portion 88b of the shroud engages the stump and is pivoted and camed by the stump out from under the cutting teeth 55, thereby permitting the cutting teeth to cut the stump.

Figure 10:
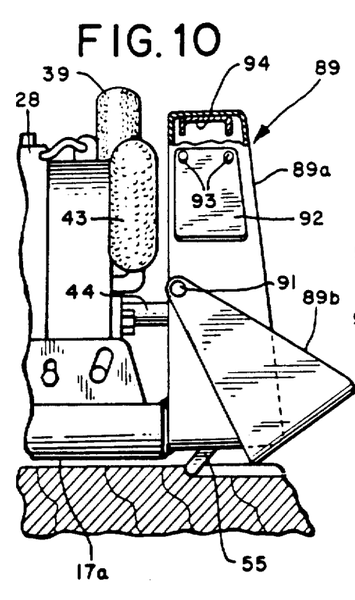
FIG. 10 is a fragmentary side view and FIG. 11 is an end view showing a modification of the stump remover of FIG. 9 wherein the shroud is provided with a internal channel-shaped debris guide to lead the flying wood debris to a flap-covered opening through which the debris may exit the shroud.
Figure 11:
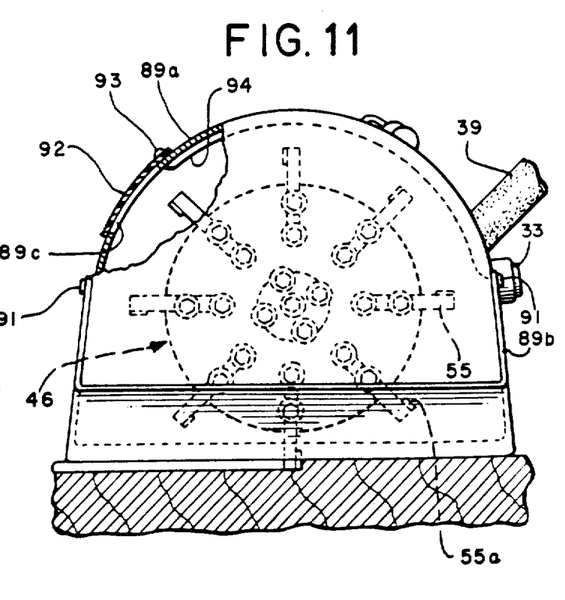

The FIG. 9 embodiment may be modified to provide the embodiment of FIGS. 10 and 11 wherein a similar shroud 89 has a major fixed portion 89a and a minor movable portion 89b which is pivotally connected to portion 89a, by a pair of pivot pins 91, so that it may be camed or kicked out of the way by a tree stump to allow the cutting teeth to cut the stump. Shroud 89 differs from shroud 88 in having an opening 89c (seen in FIG. 11) in portion 89a, through which opening the flying wood debris may exit from the shroud. A flexible debris flap 92 is connected along one of its edges to the outside of the shroud by screws 93 and normally covers the opening 89c, the flap 92 being pushed or flexed out during the cutting process by the force of the flying wood debris to uncover the opening and allow the debris to escape from the shroud. The inside of shroud portion 89a also has a channel-shaped debris guide 94 having a pair of depending, parallel guide tracks for leading or guiding the flying wood debris to opening 89c.

Figure 12:
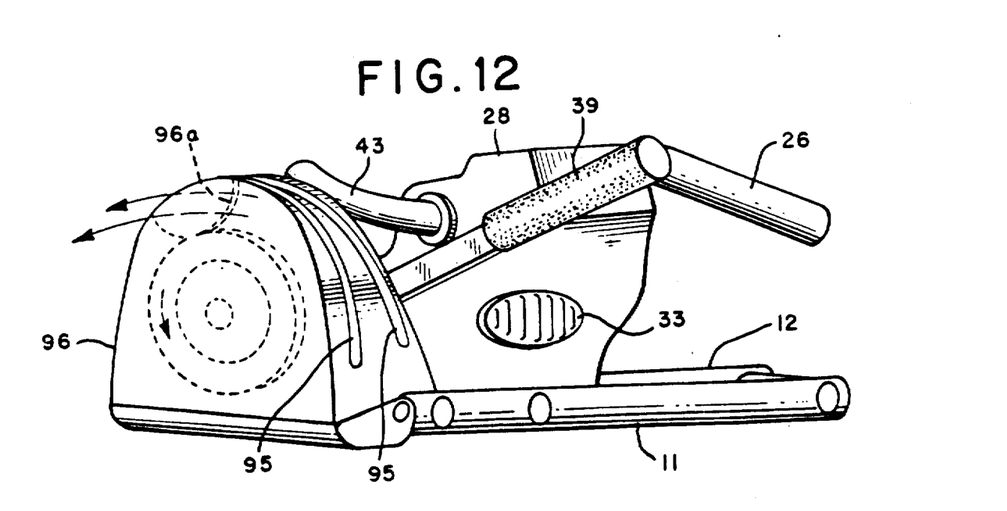
FIG. 12 illustrates a stump remover similar to that shown in FIGS. 9, 10 and 11 and shows that the debris guide, within the shroud, may take the form of two non-parallel, converging guide tracks that effectively funnel the flying wood debris to the opening in the shroud.

In the embodiment of FIG. 12, the debris guide has two non-parallel guide tracks 95, on the inside of shroud 96, that converge toward and lead to an opening 96a in the shroud in order to effectively funnel the flying wood debris to the opening.

Figures 13, 17:
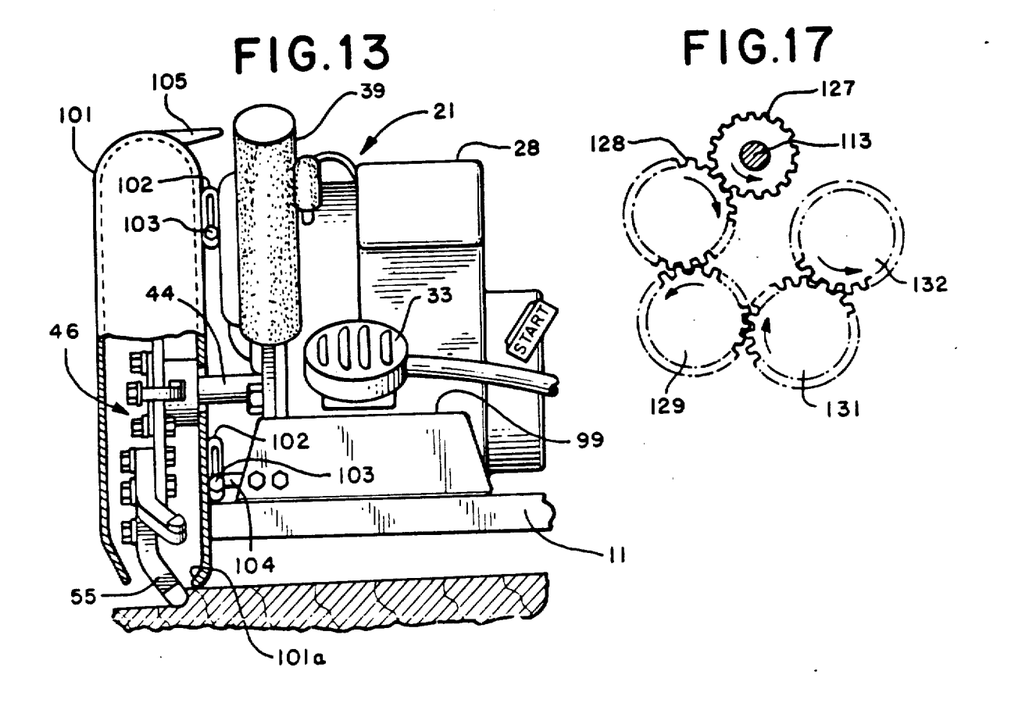
FIG. 13 is a fragmentary side view showing a modification of the stump remover of FIG. 1 and includes a vertically adjustable shroud a lower edge portion of which shroud serves as the base element, and provides the lower base surface, so that adjusting the shroud varies not only the extent to which the cutting teeth are enclosed by the shroud but also the cutting depth.
FIG. 17 shows a variation of the embodiment of FIGS. 14, 15 and 16 wherein four cutting devices are employed, two of which rotate in one direction while the other two rotate in the opposite direction to balance the opposing torques.

As mentioned previously, the base element that provides a lower base surface for riding or resting on top of a tree stump may take a variety of different forms. In the FIG. 13 embodiment, a portion of a vertically adjustable shroud may serve as the base element. In that figure, a metal bracket 99 is secured to both engine 21 and plastic tube 11 to provide a stationary engine mount. Shroud 101 is fastened to engine 21 by an adjustable bracket arrangement which permits the shroud to be vertically adjusted to, and locked in, a selected vertical position relative to engine 21 and consequently to cutting device 46. Specifically, a pair of brackets 102 are affixed to shroud 101, while a pair of bolts 103, each of which extends through a slot of one of brackets 102, screw into either the housing 28 of engine 21 or into bracket 104 which is bolted to bracket 99. Note that shroud 101 is not secured to plastic tube 11, but is adjustable with respect thereto. Moreover, a plastic plate equivalent to plate 17 is not needed between tubes 11 and 12. Note also that as shroud 101 is vertically adjusted relative to cutting device 46, an edge or rim portion 101a of the downwardly extending open end of the shroud (through which open end the cutting teeth 55 may engage and cut a tree stump) also moves vertically and provides a lower base surface that rides on top of and engages the stump when the stump remover is placed on the stump, as is evident in FIG. 13. Edge portion 101a therefore functions as and constitutes the base element, providing a lower base surface that engages the tree stump and supports, guides and stabilizes the stump remover as it is moved across the stump by the operator. Hence, when the vertical position of shroud 101 is changed, relative to the position of cutting device 46, the extent to which the cutting teeth 55 are covered and enclosed by the shroud is changed, as well as the cutting depth, namely the extent to which the cutting teeth project below the lower surface of edge portion 101a. As shown in FIG. 13, shroud 101 is locked in its uppermost position, thereby minimizing the enclosure of cutting teeth 55 by the shroud and maximizing the cutting depth. Tab 105 is affixed to shroud 101 and may be grasped by the operator to facilitate vertical adjustment of the shroud and setting of the cutting depth at a desired level.

Figure 14:
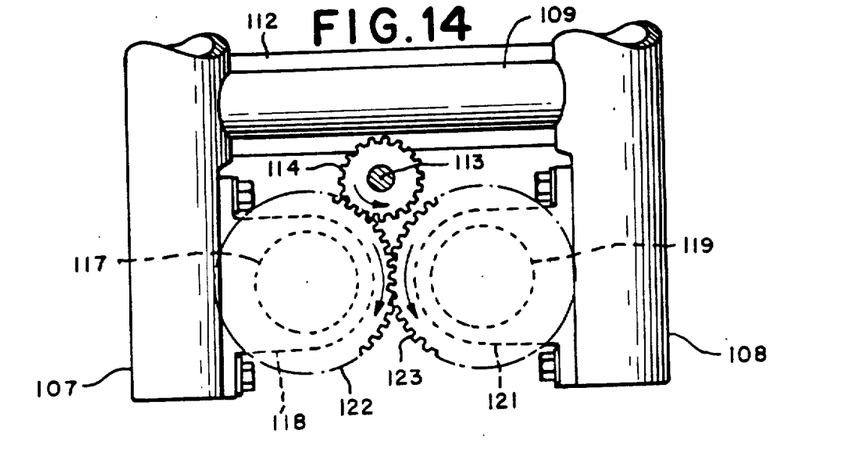
FIGS. 14 and 15 are bottom and side views respectively of another embodiment wherein a pair of oppositely rotating cutting devices each has a plurality of cutting teeth that rotate through a circular path whose plane is 90 degrees displaced from the plane defined by the circular path followed by the cutting teeth in the previous embodiments, the entire circular paths of the teeth in the FIGS. 14 and 15 embodiment therefore lying below the lower base surface to effect cutting of a stump.
Figure 15:
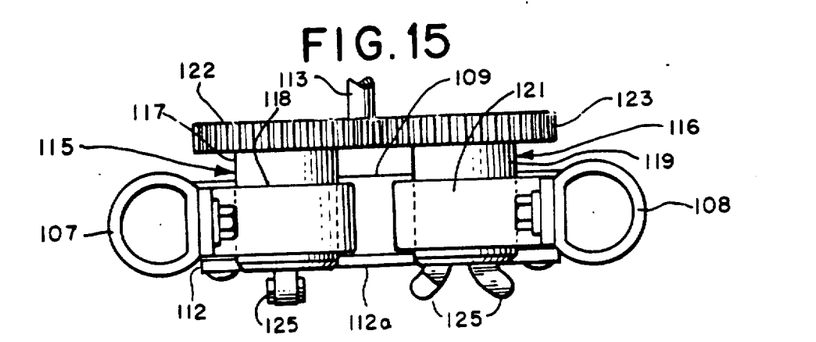
Figure 16:
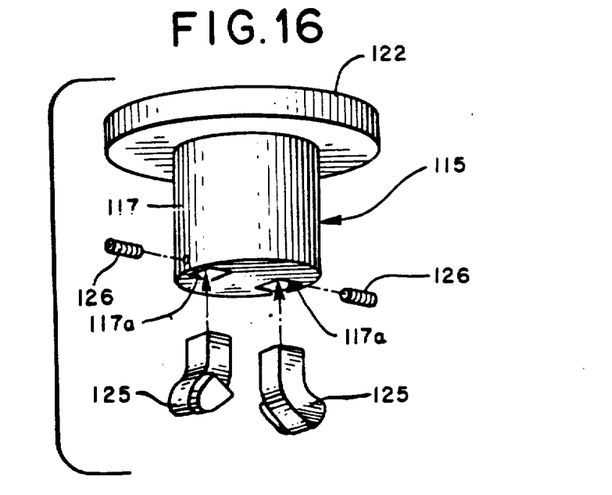
FIG. 16 is a fragmentary, exploded, perspective view of a portion of the stump remover of FIGS. 14 and 15 and illustrates the manner in which the cutting teeth of each cutting device may be removably secured to the device.

In the embodiments of FIGS. 1–13, the plane, defined by the circular path through which the cutting teeth rotate, is generally vertical and is perpendicular to the generally horizontal direction in which the operator usually moves the stump remover across a tree stump during the cutting process. With the plane of the circular path being vertical, the stump is cut by the rotating cutting teeth only as they rotate through the lowermost portion of the circular path, namely the portion of the path that extends or lies below the lower base surface. In the embodiment of FIGS. 14–16, there are also cutting teeth that rotate in a circular path, but the plane of this path is generally horizontal and parallel to the direction in which the operator pulls the stump remover across a tree stump to effect cutting thereof. In this case, the entire circular path of the cutting teeth lie below the lower base surface when the stump is cut.

More particularly, in the embodiment of FIGS. 14–16 a support frame is provided by a pair of parallel plastic tubes 107 and 108 that are interconnected by a plastic tube 109. The base element takes the form of a plastic bar 112 which is bolted to tube 109, the bottom surface 112a of the base element thereby providing the lower base surface. Although the complete driving means is not shown, it is to be understood that it may comprise an internal combustion gasoline engine which is oriented 90 degrees from its orientation in the previous embodiments so that the engine's output shaft 113 will be vertical and will extend downwardly. A drive gear 114 is secured to shaft 113 and will rotate with the shaft in the direction indicated by the associated arrow in FIG. 14 when the engine is operating. Instead of having only one cutting device rotated by engine shaft 113, two (115 and 116) are simultaneously rotated with each cutting device having a plurality of cutting teeth. Cutting device 115 comprises a vertical, cylindrical shaped body 117 rotatably mounted within a bearing 118 which is bolted to tube 107, whereas cutting device 116 has a similar vertical, cylindrical shaped body 119 rotatably mounted within a bearing 121 secured to tube 108. A driven gear 122, secured to the upper end of body 117, engages and is driven by drive gear 114 to effect rotation of body 117 around the body's longitudinal axis and in the direction indicated by the associated arrow in FIG. 14. Body 119 also has a driven gear 123 affixed to its upper end, but this gear meshes with and is driven by gear 122 so that body 119 will rotate in the direction opposite to that of body 117.

Each body 117, 119 has a pair of cutting teeth 125 removably attached to the body's lowermost end to facilitate replacement of the teeth when they are worn out. This is best seen in FIG. 16 which illustrates, by way of example, the manner in which the cutting teeth 125 are affixed to body 117 of cutting device 115. Body 117 has a pair of pockets or openings 117a for receiving the upper ends of the cutting teeth. Set screws 126 are provided to retain the cutting teeth 125 in their respective pockets.

It is apparent that when the engine is operating, shaft 113 causes the cutting teeth 125 of each cutting device 115, 116 to rotate through different circular paths, both of which paths lie in the sam horizontal plane and entirely below the lower base surface 112a. Hence, if the operator places the stump remover of FIGS. 14–16 on top of a tree stump, base surface 112a will rest on and engage the stump. By moving the stump remover across the stump in the direction in which base surface 112a will lead or be ahead of the rotating cutting teeth 125, the stump will be cut away and ground down to the cutting depth determined by the distance that cutting teeth 125 project below base surface 112a. Of course, rotating the cutting devices 115, 116 in opposite directions balances or neutralizes the opposing torques produced by the cutting devices.

Obviously, the invention may also be implemented by employing more than two simultaneously rotating cutting devices. In the FIG. 17 embodiment, the vertical and downwardly extending output shaft 113 of the engine rotates a gear 127 which drives the gear train comprising the four gears 128, 129, 131 and 132, each of gears 128–132 in turn rotating associated cutting devices (not shown) similar to that shown in FIGS. 14–16. As indicated by the arrows in FIG. 17, the two cutting devices rotated by gears 128 and 131 rotate in one direction, while the other two cutting devices rotated by gears 129 and 132 rotate in the opposite direction to balance the opposing torques of the cutting devices. Preferably, when more than two cutting devices are employed, an even number should be selected in order to facilitate neutralization of the torques developed.

While particular embodiments of the invention have been shown and described, modifications may be made, and it is intended in the appended claims to cover all such modifications as may fall within the true spirit and scope of the invention.

I claim:

1. A portable stump remover which is manually movable by an operator across a tree stump to effect grinding thereof, comprising:
   a base element for engaging the tree stump;
   at least one rotatable cutting device mounted to said base element and having a plurality of grinding teeth; and
   driving means for rotating said cutting device to rotate said grinding teeth through a circular path;
   the base element supporting the stump remover as the grinding teeth penetrate the stump to a predetermined depth as the stump remover is manually moved by the operator across the stump and the stump is cut away and ground down.

2. The stump remover according to claim 1 wherein the stump remover is provided with a handle means adapted to be held by the operator as the stump remover is moved across the stump.

3. The stump remover according to claim 1 and including a pair of handles for manual holding and guidance of the stump remover across the stump.

4. The stump remover according to claim 1 wherein said cutting device is adjustably attached to said base element for adjustment of the penetration depth thereof.

5. The stump remover according to claim 1 and including a dead man's switch for manually controlling the operation of said driving means.

6. The stump remover according to claim 1 wherein said driving means includes a motor having a rotating output shaft coupled to said cutting device to effect rotation thereof.

7. The stump remover according to claim 6 wherein said cutting device is mounted on and secured to said output shaft so as to be driven directly by said motor.

8. The stump remover according to claim 1 wherein said driving means includes a gasoline internal-combustion engine.

9. The stump remover according to claim 1 wherein said cutting device includes a wheel having a series of grinding teeth spaced around the circular periphery of the wheel.

10. The stump remover according to claim 1 wherein said base element is situated to one side of said teeth and so as to precede the rotating teeth when the stump remover is moved across the stump by the operator.

11. The stump remover according to claim 1 wherein said base element provides a planar surface that interfaces with the surface of the stump as it grinds the stump.

12. The stump remover according to claim 1 wherein said base element is a substantially flat base plate that extends across a substantial portion of the stump remover.

13. The stump remover according to claim 1 wherein said base element is provided with protuberances that define a support plane for the stump remover as the stump remover is moved across the stump.

14. The stump remover according to claim 1 wherein said grinding teeth are removably secured to said cutting device and facilitate replacement of the teeth.

15. The stump remover according to claim 1 wherein the rotating grinding teeth are offset toward the base element.

16. The stump remover according to claim 1 and including means for varying the amount by which said grinding teeth project below said base element thereby permitting adjustment of the penetration depth.

17. The stump remover according to claim 1 wherein the circular path through which said grinding teeth rotate is fixed relative to said driving means, and wherein said driving means is mounted on said base element by means of an adjustable bracket arrangement for varying the distance between the driving means and a support plane defined by the base element to adjust the penetration depth.

18. The stump remover according to claim 1 and including a shroud around said cutting device to provide a guard over the cutting device and a protective shield against flying debris created during the stump cutting process.

19. The stump remover according to claim 18 wherein said shroud has one portion which covers and encloses substantially all of said cutting device but has a downwardly extending open end through which said grinding teeth project downwardly to engage and grind the stump, and wherein said shroud has another portion which is pivotally connected to and normally encloses and guards the open end of said one portion to completely envelop said cutting device, said other portion thereby normally extending below said grinding teeth, and wherein said other portion engages the tree stump and is pivoted and cammed by the stump out from under the grinding teeth as the operator moves the stump remover across the stump, thereby permitting the grinding teeth to grind the stump.

20. The stump remover according to claim 18 wherein said shroud has an opening through which the flying debris may exit from the shroud, and includes a debris flap connected to the outside of the shroud and normally covering the opening, said flap being pushed out by the force of flying debris to uncover the opening during the grinding process to allow the debris to escape from the shroud.

21. The stump remover according to claim 20 and including a debris guide within said shroud to guide flying debris to said opening.

22. The stump remover according to claim 21 wherein said debris guide has a pair of guide tracks that provide a channel-shaped guide leading to said opening.

23. The stump remover according to claim 21 wherein said debris guide includes two non-parallel, converging guide tracks that funnel flying debris to said opening.

24. The stump remover according to claim 1 and including a shroud surrounding said cutting device in a fixed position relative to said base element so as to provide a guard over the cutting device and a protective shield against flying debris created during the stump cutting process, and biasing means for retracting said cutting device upwardly and into said shroud to the extent that the lowermost projections of the grinding teeth are positioned above said base element, said biasing means being manipulatable by the operator of the stump remover to lower the cutting device so that the grinding teeth extend below the base element and in contact with the tree stump.

25. The stump remover according to claim 24 wherein said biasing means includes at least one spring for spring mounting said driving means on said base element and normally biasing said driving means and said cutting device upwardly in a direction away from the base element, and wherein the grinding teeth extend below the base element upon application of force that overcomes the bias force of said spring.

26. The stump remover according to claim 25 wherein the spring mounting arrangement between said driving means and said base element guides the movement of said cutting device as the cutting device is retracted further into said shroud when the operator releases downward pressure on the driving means, so that the cutting device moves in an angular direction both upwardly and sideways in order to maximize the separation from the base element.

27. The stump remover according to claim 25 and including a lever attached to said driving means for pushing down of the driving means by the operator.

28. The stump remover according to claim 1 wherein the position of said driving means relative to said base element is adjustable and the adjustment thereof changes penetration depth.

29. The stump remover according to claim 1 wherein said driving means is pivotally interconnected to said base element for varying the position of said cutting device relative to the base element and the penetration depth of the grinding teeth, and wherein a locking means for locking the interconnection between the driving means and the base element to hold a predetermined penetration depth at the selected setting is present.

30. The stump remover according to claim 1 and including a shroud enveloping said cutting device to provide a guard over the cutting device and a protective shield against flying debris, said shroud having an open end through which said grinding teeth project downwardly to engage and grind the stump; and wherein the position of said shroud relative to the position of the cutting device is adjustable to vary the extent to which the grinding teeth project through the shroud's open end.

31. The stump remover according to claim 30 and including biasing means for normally biasing said shroud so as to envelop said cutting device.

32. The stump remover according to claim 31 wherein the positions of said driving means and said cutting device are fixed relative to each other, and wherein said shroud is attached to said driving means by a flexible spring bracket which, upon flexing, raises the shroud and varies the amount by which said grinding teeth extend through the shroud's open end.

33. The stump remover according to claim 32 and including a lever, attached to said shroud, for bending said flexible spring bracket to raise the shroud.

34. The stump remover according to claim 1 and including a shroud covering and substantially enclosing said cutting device to provide a guard over the cutting device and a protective shield against flying debris, said shroud having a downwardly extending open end through which said grinding teeth may project downwardly to engage and grind the tree stump, and wherein an edge portion of the open end of said shroud constitutes said base element.

35. The stump remover according to claim 34 wherein the positions of said driving means and said cutting device are fixed relative to each other, while the position of said shroud is adjustable relative to said driving means to vary the extent to which the grinding teeth project below the lower surface of said edge portion.

36. The stump remover according to claim 35 wherein said shroud is fastened to said driving means by an adjustable bracket arrangement which permits the shroud to be vertically adjusted to, and locked in, a selected vertical position relative to the driving means.

37. The stump remover according to claim 1 wherein said circular path is generally perpendicular to the direction in which the stump remover is movable across the tree stump.

38. The stump remover according to claim 1 wherein said circular path is generally parallel to the direction in which the stump remover is movable across the tree stump.

39. The stump remover according to claim 1 and including a plurality of rotatable cutting devices simultaneously rotatable by said driving means; each cutting device having a plurality of grinding teeth.

40. The stump remover according to claim 39 wherein the rotational axes of said plural cutting devices are parallel to each other, and wherein the circular paths defined by the cutting devices lie in the same plane and below said base element.

41. The stump remover according to claim 40 wherein an even number of said cutting devices is present, and wherein one half of the cutting devices present are rotated in one direction while the other half are rotated in the opposite direction so as to balance the opposing torques produced by the cutting devices.

42. The stump remover according to claim 40 wherein each of said cutting devices includes a generally vertical, elongated and cylindrical body which rotates around the body's longitudinal axis, the cutting devices teeth being attached to the body's lowermost end.

43. A portable and manually positionable tree stump remover which comprises:
an internal combustion engine having an output shaft;
rotatable grinding means coupled to said output shaft and constituted by a rotatable disk with peripherally spaced grinding teeth adjustably and removably secured thereto; and
a penetration depth gauge means mounted to said engine and controlling the depth of penetration by said grinding means into a tree stump when the grinding means is urged thereagainst.

44. The tree stump remover according to claim 43 wherein the penetration depth gauge is a shroud that partially envelops the grinding means.

45. The tree stump remover according to claim 43 wherein the penetration depth gauge is a plate mounted to said engine adjacent to said grinding means and positioned at substantially the right angle relative to the plane of rotation defined by said grinding means.

* * * * *